United States Patent
Lee et al.

(10) Patent No.: US 10,460,136 B2
(45) Date of Patent: Oct. 29, 2019

(54) TERMINAL FOR MAGNETIC SECURE TRANSMISSION (MST) AND ELECTROMAGNETIC WAVE SHIELDING STRUCTURE

(71) Applicant: WITS Co., Ltd., Yongin-si, Gyeonggi-do (KR)

(72) Inventors: Seung Min Lee, Suwon-si (KR); Sung Nam Cho, Suwon-si (KR); Ji Hyo Lee, Suwon-si (KR)

(73) Assignee: WITS Co., Ltd., Gyeonggi-do (KR)

( * ) Notice: Subject to any disclaimer, the term of this patent is extended or adjusted under 35 U.S.C. 154(b) by 0 days.

(21) Appl. No.: 15/803,300

(22) Filed: Nov. 3, 2017

(65) Prior Publication Data

US 2018/0341793 A1     Nov. 29, 2018

(30) Foreign Application Priority Data

May 26, 2017 (KR) ........................ 10-2017-0065494

(51) Int. Cl.
     *G06K 7/08*          (2006.01)
(52) U.S. Cl.
     CPC .................................... *G06K 7/087* (2013.01)
(58) Field of Classification Search
     CPC ....... G06K 19/06206; G06K 19/06196; G06K 7/0021; G06K 7/006; G06K 7/10336; G06K 13/08; G06K 19/07769; G06K 7/0004; G06K 7/084; G06K 19/0723; G06K 19/07345; G06K 19/07381; G06K 19/045; G06K 19/0726; G06K 19/07749; G06K 19/07771; G06K 19/07783; G06K 19/07794; G06K 7/082; G06K 7/10178; G06K 7/10346; G06K 13/06; G06K 19/027; G06K 19/077; G06K 19/07716; G06K 19/07718; G06K 7/108
     See application file for complete search history.

(56) References Cited

U.S. PATENT DOCUMENTS

| | | | | |
|---|---|---|---|---|
| 4,775,785 | A * | 10/1988 | Nakahara | G06K 7/0021 235/449 |
| 6,629,643 | B1 * | 10/2003 | Nagata | G06K 7/084 235/475 |
| 2014/0001263 | A1 * | 1/2014 | Babu | G06F 1/3215 235/440 |
| 2014/0042820 | A1 | 2/2014 | Park et al. | |
| 2015/0356805 | A1 * | 12/2015 | Whiteman | G06K 7/0004 382/135 |
| 2018/0232612 | A1 * | 8/2018 | Workley | G06K 19/06206 |

FOREIGN PATENT DOCUMENTS

| KR | 10-2014-0021102 A | 2/2014 |
|---|---|---|
| KR | 10-2016-0040484 A | 4/2016 |

* cited by examiner

*Primary Examiner* — Thien T Mai
(74) *Attorney, Agent, or Firm* — Harness, Dickey & Pierce, P.L.C.

(57) ABSTRACT

A terminal for magnetic secure transmission (MST) includes a body including a magnetic head and a coil member wound around the magnetic head, and an electromagnetic wave shielding structure disposed around the magnetic head and being formed of a magnetic material.

13 Claims, 7 Drawing Sheets

TERMINAL FOR MAGNETIC SECURE TRANSMISSION (MST) AND ELECTROMAGNETIC WAVE SHIELDING STRUCTURE

CROSS-REFERENCE TO RELATED APPLICATION(S)

This application claims the benefit under 35 USC § 119(a) of Korean Patent Application No. 10-2017-0065494 filed on May 26, 2017 in the Korean Intellectual Property Office, the entire disclosure of which is incorporated herein by reference for all purposes.

BACKGROUND

1. Field

The present disclosure relates to a terminal for magnetic secure transmission (MST) and an electromagnetic wave shielding structure.

2. Description of Related Art

Payment technology applied to wireless communications terminals have recently diversified. The types of payment technology of wireless communications terminals is generally classified into near field communications (NFC) based payment technologies and magnetic secure transmission (MST) based payment technologies.

NFC, based on electronic tags, refers to a technology that transmits data between terminals at a close distance in a non-contact manner in a band of about 13.56 MHz. NFC is widely utilized for applications such as, for example, the transmission of product information or travel information for visitors in a supermarket or a general shop, a traffic entrance control locking device, and wireless payments.

MST allows payments to be processed by storing payment information, such as, for example, credit card information in a wireless communication device and transmitting the stored information of the credit card to a magnetic head of an existing checker through a coil at the time of payment. In using MST for payments, a user brings a cellular phone or a wearable device into proximity with the magnetic head. There is a difference in terms of a recognition rate, depending on a position of the device or a distance from the vicinity of the magnetic head, and a null point may occur in some cases.

SUMMARY

This Summary is provided to introduce a selection of concepts in a simplified form that are further described below in the Detailed Description. This Summary is not intended to identify key features or essential features of the claimed subject matter, nor is this Summary intended to be used as an aid in determining the scope of the claimed subject.

In one general aspect, there is provided a magnetic secure transmission (MST) including a body including a magnetic head and a coil member wound around the magnetic head, and an electromagnetic wave shielding structure disposed around the magnetic head and being formed of a magnetic material.

The electromagnetic wave shielding structure may be disposed outside of the body.

The electromagnetic wave shielding structure may be removably attached to the body.

The electromagnetic wave shielding structure may include a shielding portion and a support member configured to support the shielding portion and to be inserted around the body.

The body may include an in/out region for a magnetic card.

The electromagnetic wave shielding structure may be disposed on the body and may include the in/out region for the magnetic card.

An angle formed by a portion of the electromagnetic wave shielding structure with a top surface of the body may be adjustable.

The electromagnetic wave shielding structure may be divided into two regions by the in/out region, and angles formed by each of the two regions and a top surface of the body are different.

The electromagnetic wave shielding structure has a funnel shape.

The electromagnetic wave shielding structure may be disposed in the body.

The electromagnetic wave shielding structure may have a shape that is configured to surround the magnetic head.

The electromagnetic wave shielding structure may be configured to be inserted in a groove formed in the body.

In another general aspect, there is provided an electromagnetic wave shielding structure for a magnetic secure transmission (MST) terminal, the electromagnetic wave shield including a shielding portion formed of a magnetic material, and a support member configured to support the shielding portion and to be removably coupled to the MST terminal.

The electromagnetic wave shielding structure may include an in/out region for a magnetic card formed in the shielding portion.

The shielding portion may form an angle with a top surface of the support member that may be adjustable.

The in/out region may divide the shielding portion into two, and angles formed by each of the two regions with the top surface of the support member may be different.

The shielding portion may have a funnel shape.

The shielding portion may have a trapezoidal shape.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for the purposes of clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after gaining a thorough an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

Throughout the specification, when an element, such as a layer, region, or substrate, is described as being "on," "connected to," "coupled to," "over," or "covering" another element, it may be directly "on," "connected to," "coupled to," "over," or "covering" the other element, or there may be one or more other elements intervening therebetween. In contrast, when an element is described as being "directly on," "directly connected to," "directly coupled to," "directly over," or "directly covering" another element, there can be no other elements intervening therebetween.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. As used herein, the term "and/or" includes any one and any combination of any two or more of the associated listed items.

Due to manufacturing techniques and/or tolerances, variations of the shapes shown in the drawings may occur. Thus, the examples described herein are not limited to the specific shapes shown in the drawings, but include changes in shape that occur during manufacturing.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Figure 1:
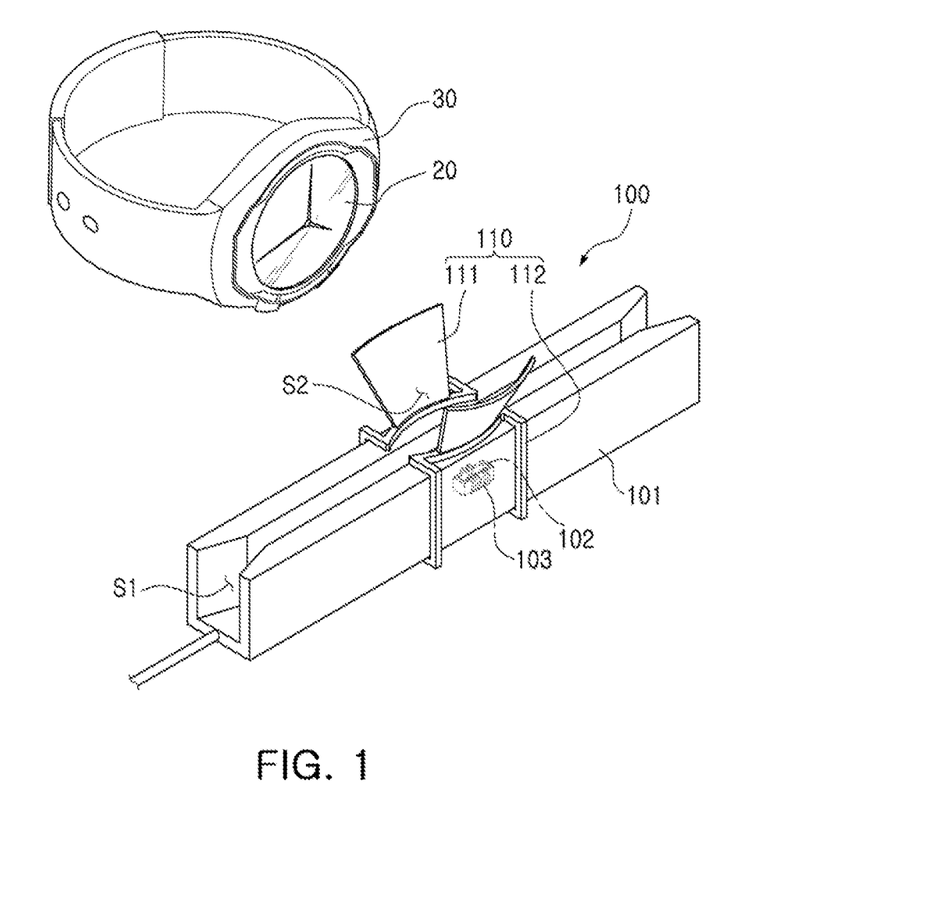
FIG. 1 is a diagram illustrating an example of a terminal for MST.
Figure 4:
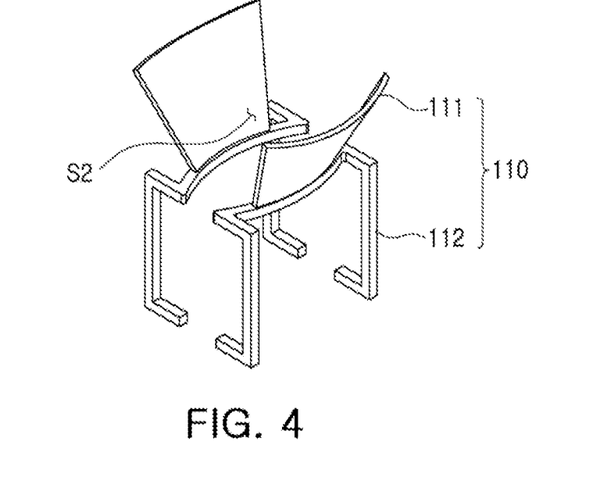
FIG. 4 is a diagram illustrating an example of an electromagnetic wave shielding structure for the terminal for MST used in the example of FIG. 1.

FIG. 1 is a diagram illustrating an example of a terminal for MST. FIG. 4 is a diagram illustrating an example of an electromagnetic wave shielding structure for the terminal for MST.

In an example, a terminal 100 for MST includes a body 101 and an electromagnetic wave shielding structure 110. In an example, the body 101 includes a magnetic head 102 and a coil member 103, wound around the magnetic head 102. In an example, the electromagnetic wave shielding structure 110 may be disposed around the magnetic head 102 and may be formed of a magnetic material. Since a magnetic flux is not leaked from the portable communications device 30 and may be effectively transmitted to the magnetic head 102 by applying the electromagnetic wave shielding structure 110 around the magnetic head 102, a recognition distance and efficiency of the terminal 100 for MST is improved at the time of electronic approval. Accordingly, an occurrence of a null point around the terminal 100 for MST is reduced.

Figure 2:
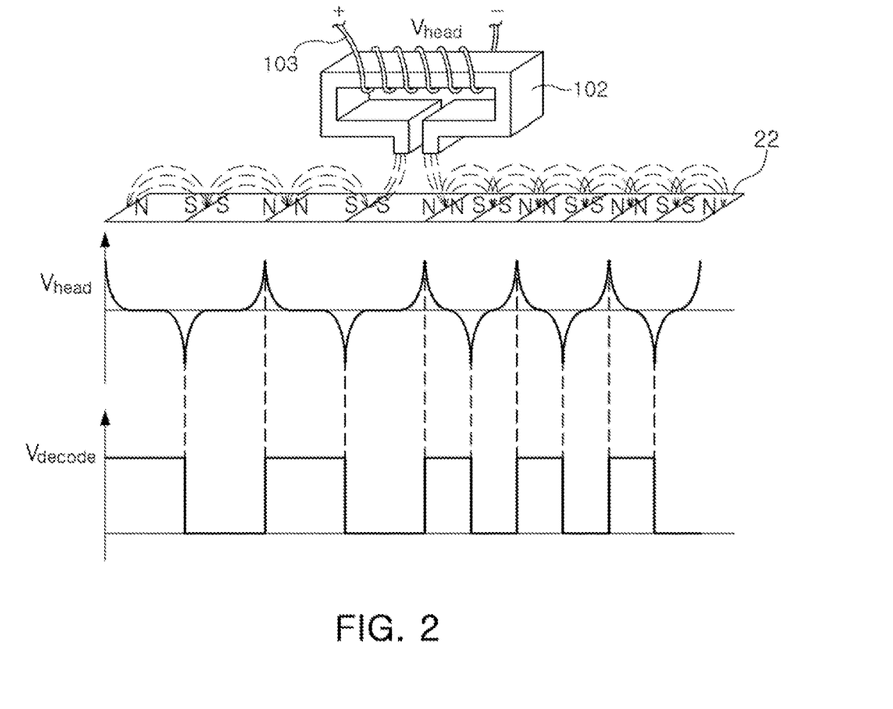
FIG. 2 is a illustrating an example of voltage across a magnetic head adjacent to a magnetic card.
Figure 3:
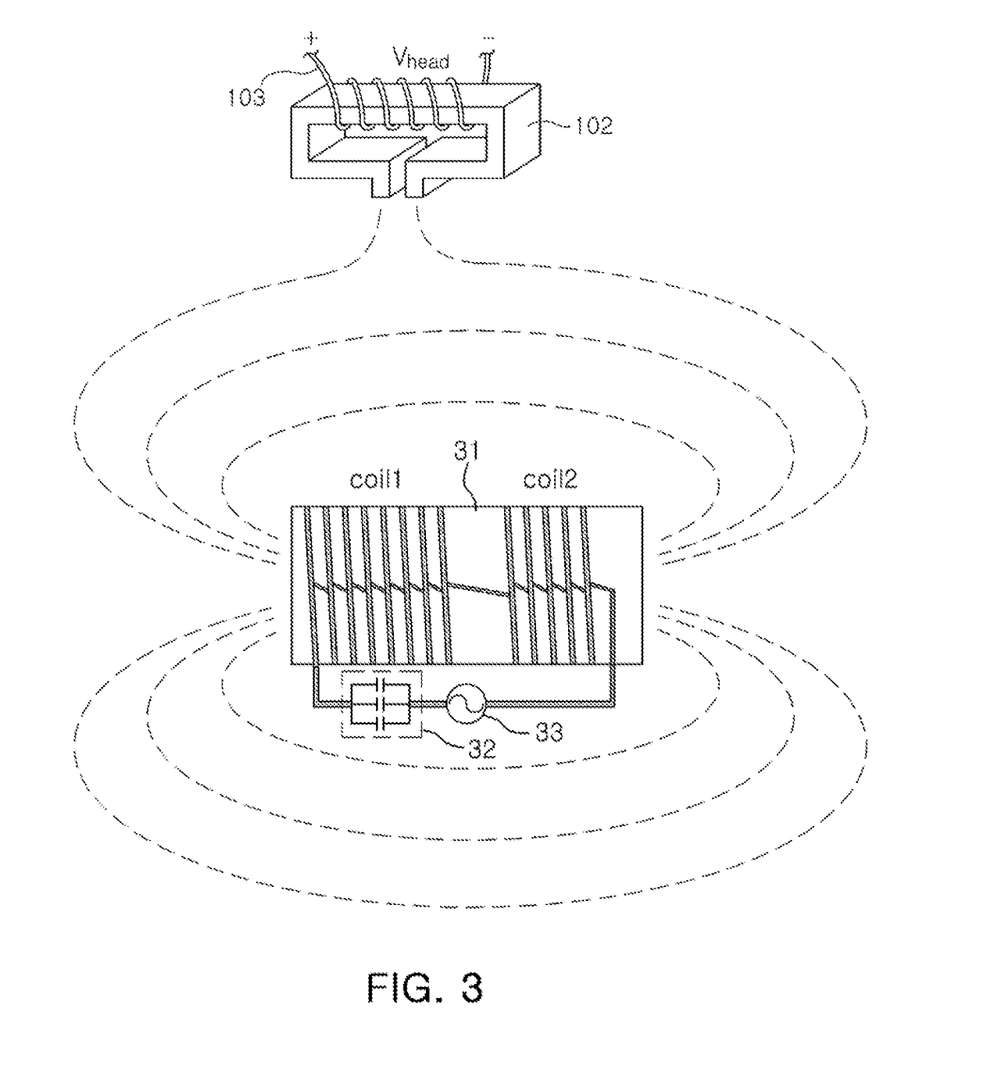
FIG. 3 is a diagram illustrating an example in which a magnetic head of the terminal for MST is magnetically coupled to a wireless communications antenna of a portable communications device.

An operation of the terminal 100 for MST when the portable communications device is close to the terminal 100 for MST will be described with reference to FIGS. 2 and 3. FIG. 2 is a diagram illustrating an example of voltage across a magnetic head adjacent to a magnetic card. FIG. 3 is a diagram illustrating an example in which a magnetic head of the terminal for MST is magnetically coupled to a wireless communications antenna of a portable communications device.

The present examples illustrate a wearable device as the portable communications device 30. In other examples, the portable communications device 30 may be a mobile phone, a cellular phone, a smart phone, a wearable smart device (such as, a ring, a watch, a pair of glasses, glasses-type device, a bracelet, an ankle bracket, a belt, a necklace, an earring, a headband, a helmet, a device embedded in the cloths, or an eye glass display (EGD)), a personal computer (PC), a laptop, a notebook, a subnotebook, a netbook, an ultra-mobile PC (UMPC), a tablet personal computer (tablet), a phablet, a mobile internet device (MID), a personal digital assistant (PDA), an enterprise digital assistant (EDA), a digital camera, a digital video camera, a portable game console, an MP3 player, a portable/personal multimedia player (PMP), a handheld e-book, an ultra mobile personal computer (UMPC), a portable lab-top PC, a global positioning system (GPS) navigation, a personal navigation device, portable navigation device (PND), a handheld game console, an e-book, a smart appliance, various Internet of Things (IoT) devices that are controlled through a network, and other consumer electronics/information technology(CE/IT) devices. In another example, the portable communications device 30 is an electronic device, worn on a human body such as an arm, a head, or fixed to a specific structure by a strap.

In an example, the wireless communications antenna 20 is applied to the portable communications device 30 and may form a magnetic field under control of the portable communications device 30. The wireless communications antenna 20 may operate as a transmitting coil, and may be magnetically coupled to a wireless signal receiver including a receiving coil to wirelessly transmit information. The wireless communications antenna 20 may form a widespread magnetic field using the transmitting coil, and may be magnetically coupled to the terminal 100 for MST even when a position or an angle of the coil member 103 corresponding to the receiving coil of the terminal 100 for MST is changed.

According to an example, the wireless communications antenna 20 transmits data, such as, for example, credit card number data, personal identification information, intended to be transmitted to the terminal 100 for MST by changing a direction of the magnetic field. The terminal 100 for MST may generate the information, such as credit card number data using a change in a voltage across the receiving coil caused by the change in the direction of the magnetic field formed by the wireless communications antenna 20.

In an example, the terminal 100 for MST includes the magnetic head 102. The magnetic head 102 generates a voltage by subtending magnetic flux. The coil member 103, wound around the magnetic head 102, is provided, and a voltage $V_{head}$ across the coil member 103 generated by the magnetic field is detected. When the coil member 103 experiences a change in the magnetic field, a voltage $V_{head}$ across the coil member 103 is generated by the magnetic flux. The generated voltage $V_{head}$ across the coil member 103 is provided to an analog-digital converter, and the analog-digital converter generates a decoded signal $V_{decode}$ from the voltage across the coil member 103. The decoded signal $V_{decode}$ may be, for example, a digital voltage signal, and credit card information data may be generated from the decoded signal $V_{decode}$.

As illustrated in FIG. 2, a magnetic card may have a magnetized magnetic stripe 22. As the magnetic head 102 is moved over the magnetic stripe 22, the voltage $V_{head}$ across the coil member 103 of the magnetic head 102 may be generated by the magnetic flux. The voltage $V_{head}$ across the coil member may have a peak voltage depending on polarities of the magnetic stripe 22. For example, when the same polarities are adjacent to each other—S to S, or N to N—, the voltage $V_{head}$ across the coil member may have the peak voltage. In an example, the analog-digital converter generates the decoded signal $V_{decode}$ from the voltage $V_{head}$ across the coil member. For example, the analog-digital converter generates an edge whenever the peak voltage is detected to generate the decoded signal $V_{decode}$.

In an example, the decoded signal $V_{decode}$ is a digital voltage signal from which digital data is decoded. For example, depending on a length of a period of the decoded signal $V_{decode}$, a '1' or '0' may be decoded. As seen in FIG. 2, a first period and a second period of the decoded signal $V_{decode}$ are two times of a third period of the decoded signal $V_{decode}$. Therefore, the first period and the second period of the decoded signal $V_{decode}$ may be decoded to '1', and a third period to a fifth period may be decoded to '0'. Such a decoding method is an illustrative example, and various decoding technologies may be applied without departing from the spirit and scope of the illustrative examples described.

FIG. 2 illustrates an example in which the magnetic card reader performs the decoding from the magnetized magnetic stripe. In an example, the magnetic head 102 is capable of generating the voltage across the coil member 103 from the magnetic field generated by the wireless communications antenna 20 as well as the magnetized magnetic stripe. In an example, the magnetic head 102 of the magnetic card reader is magnetically coupled to the transmitting coil of the wireless communications antenna 20 to receive data, e.g., credit card number data.

As illustrated in FIG. 3, a driving signal from a driving signal generator 33 is applied to the wireless communications antenna 31 to form the magnetic field. In an example, the magnetic head 102 is magnetically coupled to the magnetic field formed by the transmitting coil to receive data. In an example, the wireless communications antenna 31 includes a filter circuit 32 to remove noise from the driving signal or to convert the driving signal.

An example of the electromagnetic wave shielding structure for a terminal for MST will be described with reference to FIGS. 1 and 4. In an example, the electromagnetic wave shielding structure 110 is disposed outside of the body 101 of the terminal 100 for MST. The electromagnetic wave shielding structure 110 is removably coupled to the body 101. The electromagnetic wave shielding structure 110 includes a shielding portion 111 and a support member 112 to support the shielding portion 111. In an example, the support member 112 is coupled to the body 101 by being inserted around the body 101. In an example, the support member 112 is provided as a form of clip or elastic fixture to be removable secured to the body 101. In an example, the support member 112 has a shape that is complimentary to that of the body 101, such that the support member is capable of being inserted snugly around the body 101.

In an example, when the electromagnetic wave shielding structure 110 is removably coupled to the terminal 100 for MST, whether or not the terminal 100 for MST is removable may be determined as needed for improving a use or recognition efficiency of the terminal 100 for MST. In an example, in order to more smoothly use the magnetic card, the body 101 may be separated from the terminal 100 for MST. The shielding portion 111 may be manufactured separately from the support member 112 and coupled to the support member 112, for example, by being inserted into a groove formed in the support member 112. In another example, the shielding portion 111 is manufactured integrally with the support member 112.

As described above, the electromagnetic wave shielding structure 110 performs shielding so that the magnetic flux around the magnetic head 102 is not leaked. The electromagnetic wave shielding structure 100 reduces a null point by improving recognition efficiency of the terminal 100 for MST, and may include a magnetic material. In an example, the magnetic material is a material having high permeability, such as, for example, an amorphous alloy, a nanocrystalline alloy, or a ferrite. The alloy or the ferrite may be used as a composite sheet in which the alloy or the ferrite is manufactured in a form of thin plate or is manufactured in a form of particle and is then dispersed in a resin. In an example, the electromagnetic wave shielding structure 110 is processed and used in a shape suitable for guiding the magnetic flux in a direction of the magnetic head 102. In an example, the electromagnetic wave shielding structure 110 has a funnel shape or is appropriately deformed in different shapes capable of focusing the magnetic flux.

In an example as illustrated in FIG. 1, the terminal 100 for MST includes a magnetic card reader, and the body 101 includes an in/out region S1 for the magnetic card. The electromagnetic wave shielding structure 110 may also have an appropriate complimentary form so as not to interfere with a motion of the magnetic card and a hand. In an example, an in/out region S2 for the magnetic card may be formed in an upper portion of the body 101 in the electromagnetic wave shielding structure 110.

Figure 5:
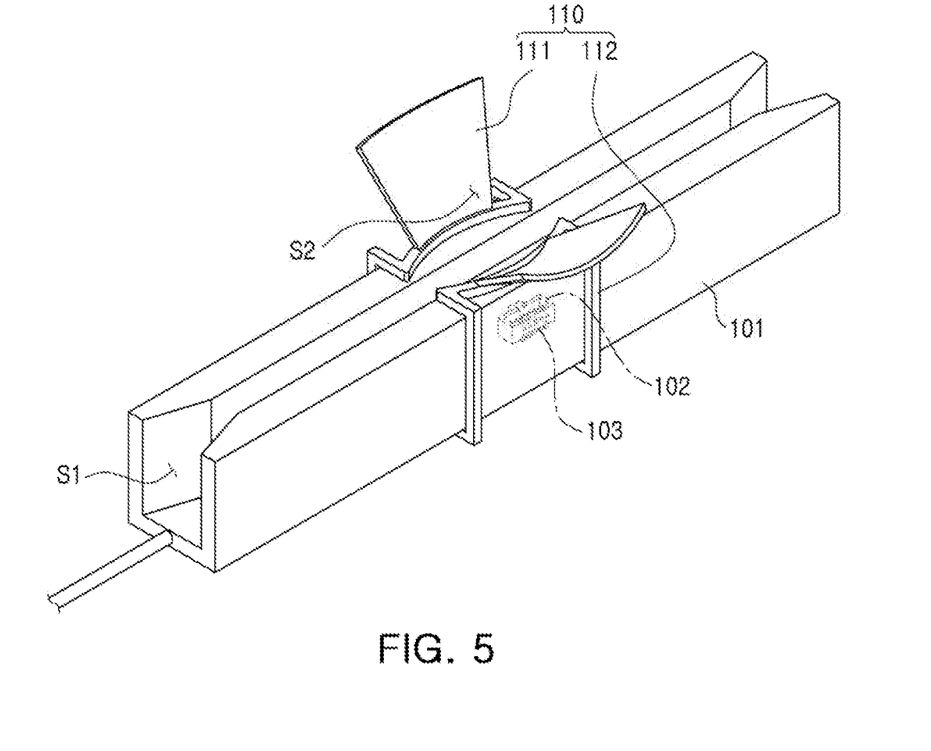
FIG. 5 is a diagram illustrating an example of a terminal for MST.

In the example of FIG. 5, the electromagnetic wave shielding structure 110 may have a structure in which an angle of the shielding portion 111 of the wave shielding structure 110 with respect to a top surface of the body 101 is adjustable. In an example, the electromagnetic wave shielding structure 110 is divided into two regions, and the in/out region S2 of the magnetic card is interposed between the two regions. In an example, the angle of each of the two regions of the electromagnetic wave shielding structure 110 with respect to the top surface of the body 101 are different from each other. Thus, two the shielding portions 111 of the wave shielding structure 110 have angle adjustable structure, i.e., the angle of each of the shielding portion can be adjusted with respect to the top of the body 101. In such an arrangement, as illustrated in FIG. 5, the magnetic card may be smoothly read by disposing a portion of the electromagnetic wave shielding structure 110 at a side where a human's hand passes with a relatively larger inclination when the magnetic card is read.

Figure 6:
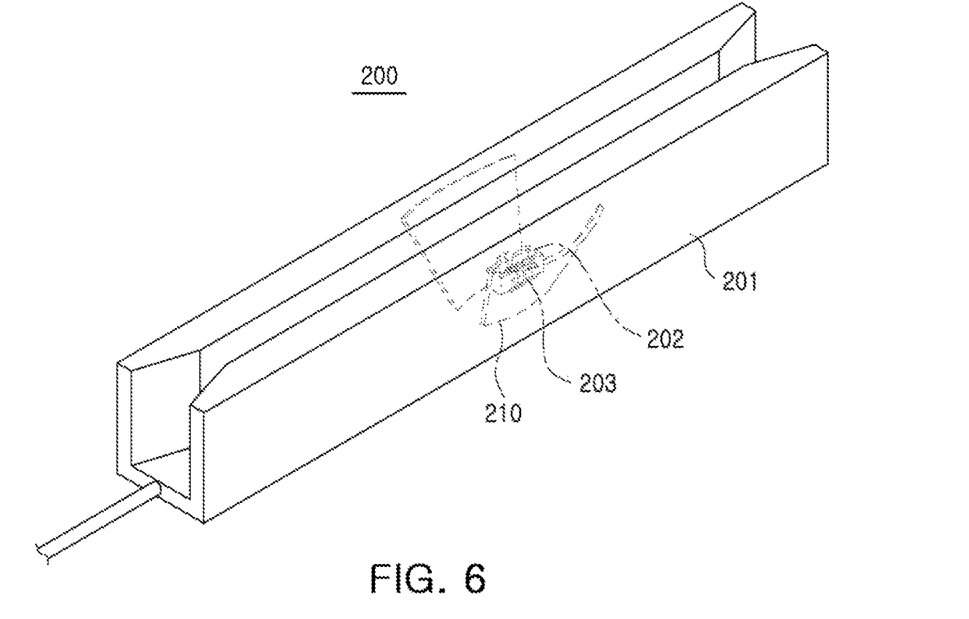
FIGS. 6 and 7 are diagrams illustrating examples of a terminal for MST.
Figure 7:
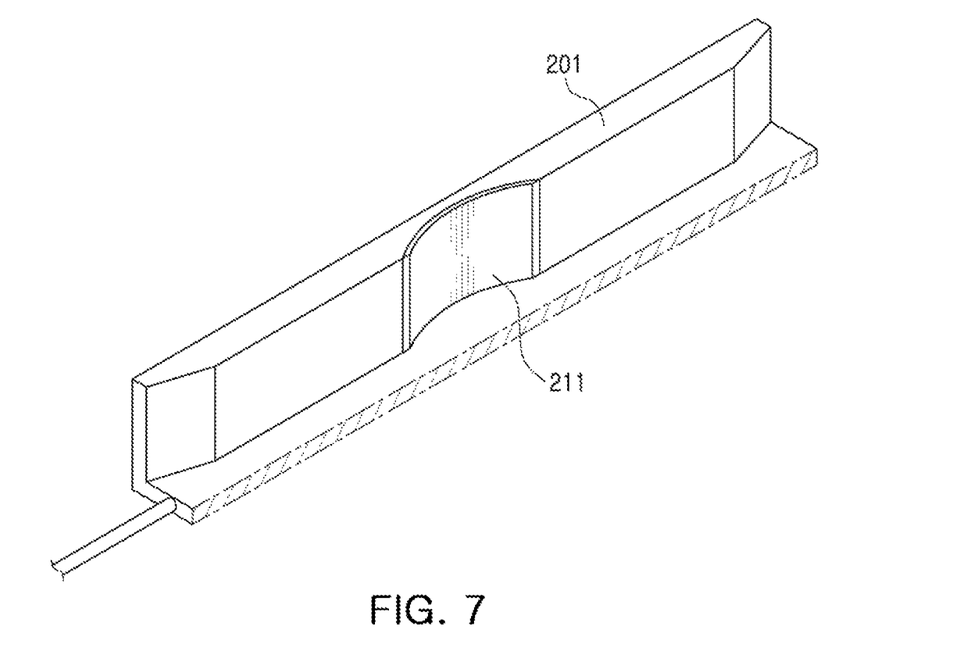

In another example, the electromagnetic wave shielding structure is disposed in the body. FIGS. 6 and 7 are diagrams illustrating an example of a terminal for MST. Referring to FIG. 6, a terminal 200 for MST include a body 201 and an electromagnetic wave shielding structure 210 disposed in the body 201. In addition, similar to the examples described above, the body 201 includes a magnetic head 202 and a coil member 203, wound around the magnetic head 202. The electromagnetic wave shielding structure 210 surrounds the magnetic head 202, and is disposed to be close to the magnetic head 202 to improve shielding efficiency of the magnetic flux. In the example of FIGS. 6 and 7, since a separate structure is not added to the outside of the body 201, a use of the magnetic card may not be interrupted.

To dispose the electromagnetic wave shielding structure 210 in the body 201, the body 201 is formed in a shape surrounding the electromagnetic wave shielding structure 210 by a method such as, for example, a plastic injection molding. In another example, as illustrated in FIG. 7, an electromagnetic wave shielding structure 211 is inserted in a groove formed in the body 201. Thus, the electromagnetic wave shielding structure 211 is coupled to the body 201.

Figure 8:
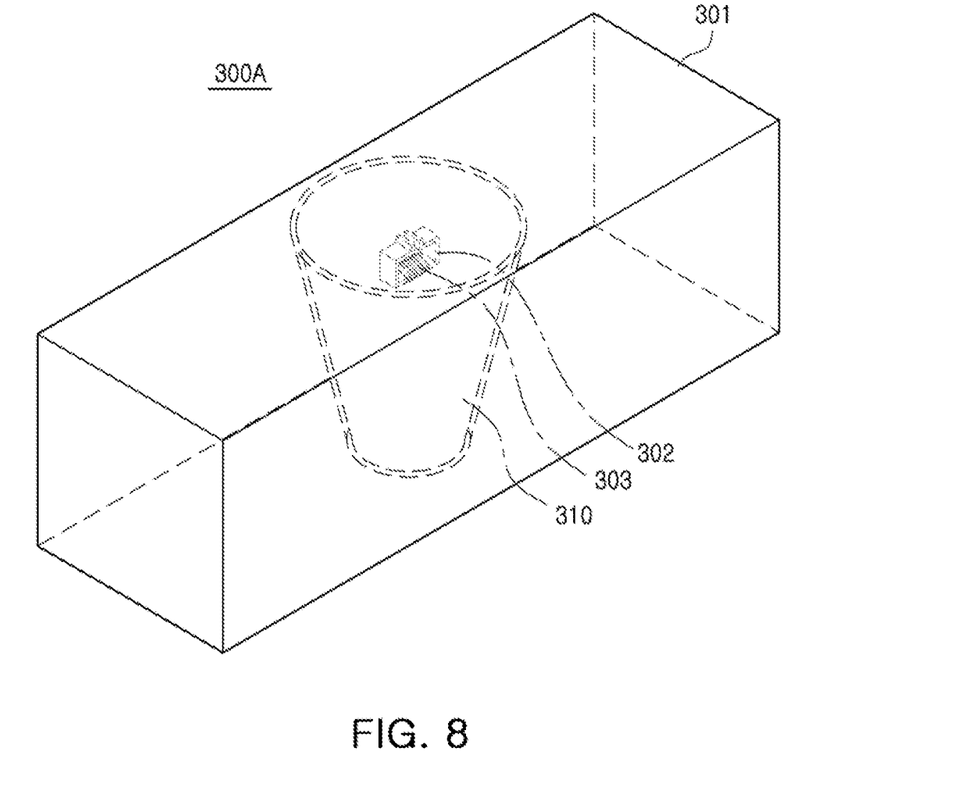
FIGS. 8 and 9 are diagrams illustrating examples of a terminal for MST.

FIGS. 8 and 9 are diagrams illustrating examples of a terminal for MST. According to an example of FIG. 8, a terminal 300A for MST, an MST dedicated terminal that does not include the magnetic card reader, includes a body 301, a magnetic head 302, a coil member 303, and an electromagnetic wave shielding structure 310. In an example, the electromagnetic wave shielding structure 310 is disposed in the body 301 and is formed in a funnel shape surrounding the magnetic head 302 to sufficiently shield the magnetic flux. Accordingly, performance of the terminal 300A for MST is improved. In this case, the portable communications device may be disposed on the body 301.

Figure 9:
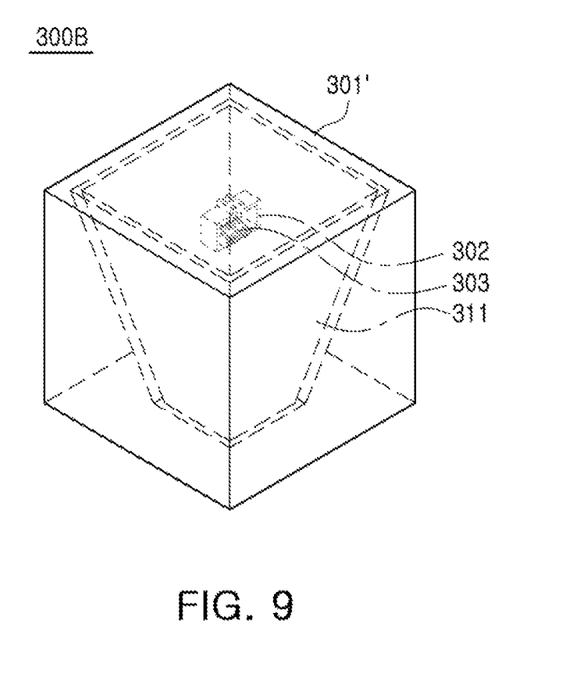

In an example of FIG. 9, an MST dedicated terminal is designed to be matched to a shape of the portable communications device. A terminal 300B for MST includes a body 301', the magnetic head 302, the coil member 303, and an electromagnetic wave shielding structure 410. The electromagnetic wave shielding structure 410 may have a shape corresponding to a portion of a trapezoidal cone so as to corresponding to a shape of an opening in the top surface of the body 301'. Although not illustrated, a shape of the terminal 300B for MST may be customized according to an intended portable communications device. For example, when the terminal 300B for MST is used for a wearable device such as a smart watch, an upper portion of the body 301' may also be formed in a circular shape having a relatively compact size. As such, the user may more easily contact the portable communications device with the terminals 300A and 330B for MST by implementing the shapes of the terminals 300A and 300B for MST to correspond to the shape of the portable communications device. Further, since the magnetic flux is effectively focused by the electromagnetic wave shielding structures 310 and 311 implemented to be matched to those described above.

As set forth above, when the terminal for MST is used, the difference in the recognition rate depending on the position of the portable communications device and the null point is significantly reduced.

An aspect of the present disclosure discloses a terminal for magnetic secure transmission (MST) and an electromagnetic wave shielding structure capable of significantly reducing a difference in recognition rates depending on a position of a portable communications device and a null point While this disclosure includes specific examples, it will be apparent after gaining a thorough an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A magnetic secure transmission (MST) terminal comprising:
    a body configured to receive a magnetic flux, and comprising a magnetic head and a coil member wound around the magnetic head; and
    an electromagnetic wave shielding structure configured to focus the magnetic flux toward the magnetic head, having a surface area increases or decreases in proportion to a distance from the head, and being formed of a magnetic material.

2. The MST terminal of claim 1, wherein the electromagnetic wave shielding structure is disposed outside of the body.

3. The MST terminal of claim 2, wherein the electromagnetic wave shielding structure is removably attached to the body.

4. The MST terminal of claim 3, wherein the electromagnetic wave shielding structure comprises a shielding portion and a support member configured to support the shielding portion and to be inserted around the body.

5. The terminal for MST terminal of claim 2, wherein the body comprises an in/out region for a magnetic card.

6. The MST of claim 5, wherein the electromagnetic wave shielding structure is disposed on the body and comprises the in/out region for the magnetic card.

7. The MST terminal of claim 6, wherein an angle formed by a portion of the electromagnetic wave shielding structure with a top surface of the body is adjustable.

8. The MST terminal of claim 6, wherein the electromagnetic wave shielding structure is divided into two regions by the in/out region, and
- angles formed by each of the two regions of the electromagnetic wave shielding structure and a top surface of the body are different.

9. The terminal for MST terminal of claim 1, wherein the electromagnetic wave shielding structure has a funnel shape.

10. The MST terminal of claim 1, wherein the electromagnetic wave shielding structure is disposed in the body.

11. The MST terminal of claim 10, wherein the electromagnetic wave shielding structure has a shape that is configured to surround the magnetic head.

12. The MST terminal of claim 10, wherein the electromagnetic wave shielding structure is configured to be inserted in a groove formed in the body.

13. The MST terminal of claim 1, wherein the electromagnetic wave shielding structure comprises a curved surface.

\* \* \* \* \*